United States Patent [19]
Brown

[11] Patent Number: 5,560,413
[45] Date of Patent: Oct. 1, 1996

[54] PANEL CONNECTOR SYSTEM

[75] Inventor: David S. Brown, Royse City, Tex.

[73] Assignee: Brown Office Systems, Inc., Royse City, Tex.

[21] Appl. No.: 478,545

[22] Filed: Jun. 7, 1995

[51] Int. Cl.$^6$ ........................................................ A47G 5/00
[52] U.S. Cl. ............................................. 160/135; 403/403
[58] Field of Search ................................... 160/135, 233, 160/234; 403/338, 335, 403, 382, 205; 52/239, 238.1

[56] References Cited

U.S. PATENT DOCUMENTS

| | | | |
|---|---|---|---|
| 3,428,108 | 2/1969 | Singer | 160/135 |
| 3,768,222 | 10/1973 | Birum | 160/135 X |
| 3,842,555 | 10/1974 | Korell | 52/238 |
| 4,104,838 | 8/1978 | Hage et al. | 160/135 X |
| 4,118,903 | 10/1978 | Coulthard | 52/36 |
| 4,860,812 | 8/1989 | DePietro et al. | 160/135 |
| 4,947,601 | 8/1990 | McGuire | 52/239 |
| 5,097,643 | 3/1992 | Wittler | 52/238.1 |
| 5,363,612 | 11/1994 | Erickson | 52/239 |

*Primary Examiner*—David M. Purol
*Attorney, Agent, or Firm*—William Lloyd Clayborn; John M. Cone

[57] ABSTRACT

In the preferred embodiment of a panel connector system, the connectors are channel-shaped in cross section. Each of the connector's legs includes an inwardly extending lip, and the connector's base includes two inwardly extending studs. Each of the panels for the system includes a frame including upper and lower horizontal members and two vertical faces attached to the frame. The edges of the horizontal members include two orifices located near the vertical edges of the panel and adapted to engage a connector stud. When a connector is installed on two adjacent panels, one stud engages an orifice in the first panel and another stud engages an orifice in the second panel. When installed, the inwardly extending lips on the connector legs engage horizontally extending grooves in the vertical faces of the panel. The system includes connectors for connecting two aligned panels, two panels at a right angle, three panels, and four panels.

13 Claims, 3 Drawing Sheets

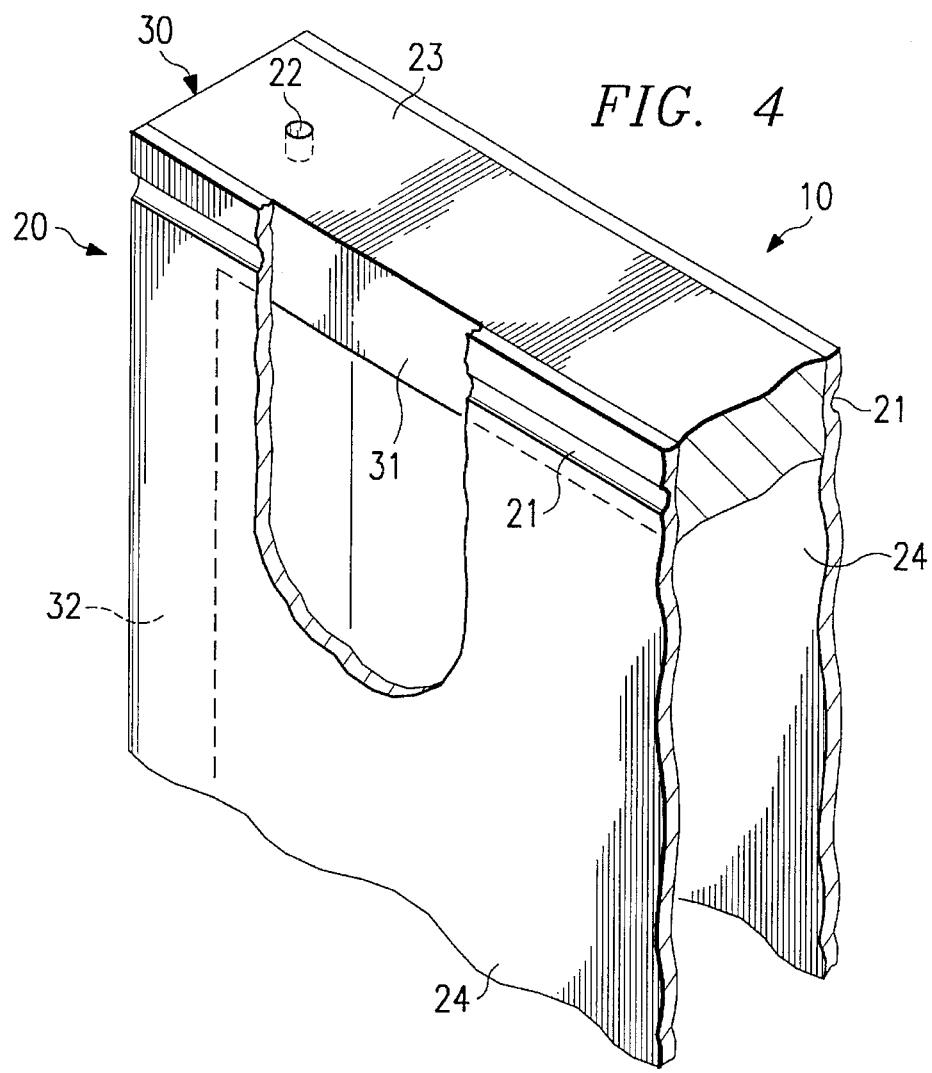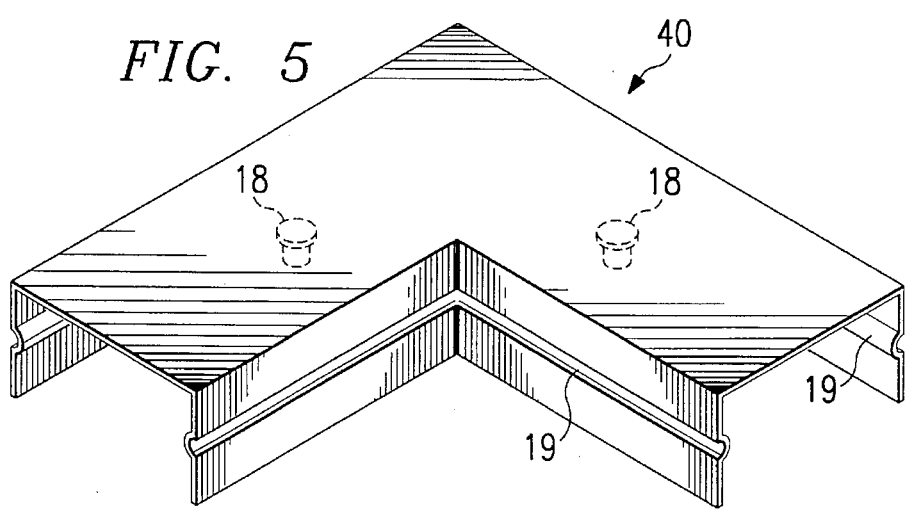

PANEL CONNECTOR SYSTEM

BACKGROUND OF THE INVENTION

The present invention relates to a panel connector system for movable panels.

Several panel connector systems have been designed for joining two or more adjacent panels together. These connector systems include connectors with looped attachment material, flat elongated connectors, interlocking edge connectors, and vertical edge connectors. The prior art systems, however, are either difficult to assemble or expensive and, if simple, lack adaptability and the ability to securely connect the adjacent panels.

The panel connector system disclosed by Coulthard, U.S. Pat. No. 4,118,903, uses a looped attachment material, such as VELCRO, within the base of a channel-section connector and on the horizontal edges of the panels. The connector is placed over the panels at the intersection of adjacent panels. While Coulthard provides for easy assembly and disassembly, the connection is not a secure one, nor are adjacent panels positively located relative to each other.

McGuire, U.S. Pat. No. 4,947,601, discloses a wall panel system for the connection of adjacent panels which requires various configurations of upper connecting members and lower connecting members. The upper connecting members are planar members which are connected to the horizontal upper edge of the panels at the intersection of adjacent panels. The lower connecting members are channel brackets which hold the panel between the legs of the brackets and receive screws for fastening the brackets to the panels. The connectors are then covered by a trim system. The McGuire connecting system provides for secure attachment, but is complex and difficult to assemble.

Wittler, U.S. Pat. No. 5,097,643, discloses an edge connector for connecting adjacent panels along their vertical edges. The vertical edge connector fits into a groove in the panel and extends vertically along the length of the side edge of the panel. The vertical edge connector is an L-shaped member. A second vertical edge connector affixed to the adjacent panel is also an L-shaped member oriented in the opposite direction of the first L-shaped member, thereby enabling the second connector to engage the first connector. This connector system requires the use of significant amounts of materials, thus increasing the cost and complexity of the system.

Korell, U.S. Pat. No. 3,842,555, discloses a plurality of elongated connectors which are attached to a horizontal edge of a panel with one end of each connector partially extending from the edge. A first elongated connector includes a boss at the extended end and a second elongated connector extending from an adjacent panel includes an opening for receiving the boss. Although the Korell device is simple to use, the connection is not a secure one.

Erickson, U.S. Pat. No. 5,363,612, discloses a connector having a base and first and second legs extending from the base. Each leg of the connector engages a channel member which is affixed vertically to the length of the side edge of adjacent panels. The Erickson connector requires the use of significant amounts of materials, thus increasing the cost and complexity of the system. Further, the connection results in the adjacent panels not being directly connected, which leaves an opening between the connected panels.

SUMMARY OF THE INVENTION

The primary object of the present invention is to provide a panel connector system which is easy to use, adaptable, provides a secure connection, and positively locates adjacent panels relative to each other.

Another object is to provide a panel connector system which is easily reconfigured.

Another object is to provide a panel connector system which requires a minimum number of components, thereby reducing the cost and complexity of the system.

A preferred embodiment of the invention includes a plurality of connectors and a plurality of panels. The connectors are channel-shaped in cross section. Each of the connector's legs includes an inwardly extending lip, and the connector's base includes two inwardly extending studs. Each of the panels for the system includes a frame including upper and lower horizontal members and two vertical faces attached to the frame. The edges of the horizontal members include two orifices located near the vertical edges of the panel and adapted to engage a connector stud. When a connector is installed on two adjacent panels, one stud engages an orifice in the first panel and another stud engages an orifice in the second panel. When installed, the inwardly extending lips on the connector legs engage horizontally extending grooves in the vertical faces of the panel. The system includes connectors for connecting two aligned panels, two panels at a right angle, three panels, and four panels.

BRIEF DESCRIPTION OF DRAWINGS

FIG. 4 is a partially cut-away perspective view of a corner portion of a panel;

FIG. 5 is a perspective view of connector for connecting two panels at a right angle.

DETAILED DESCRIPTION

Figure 1:
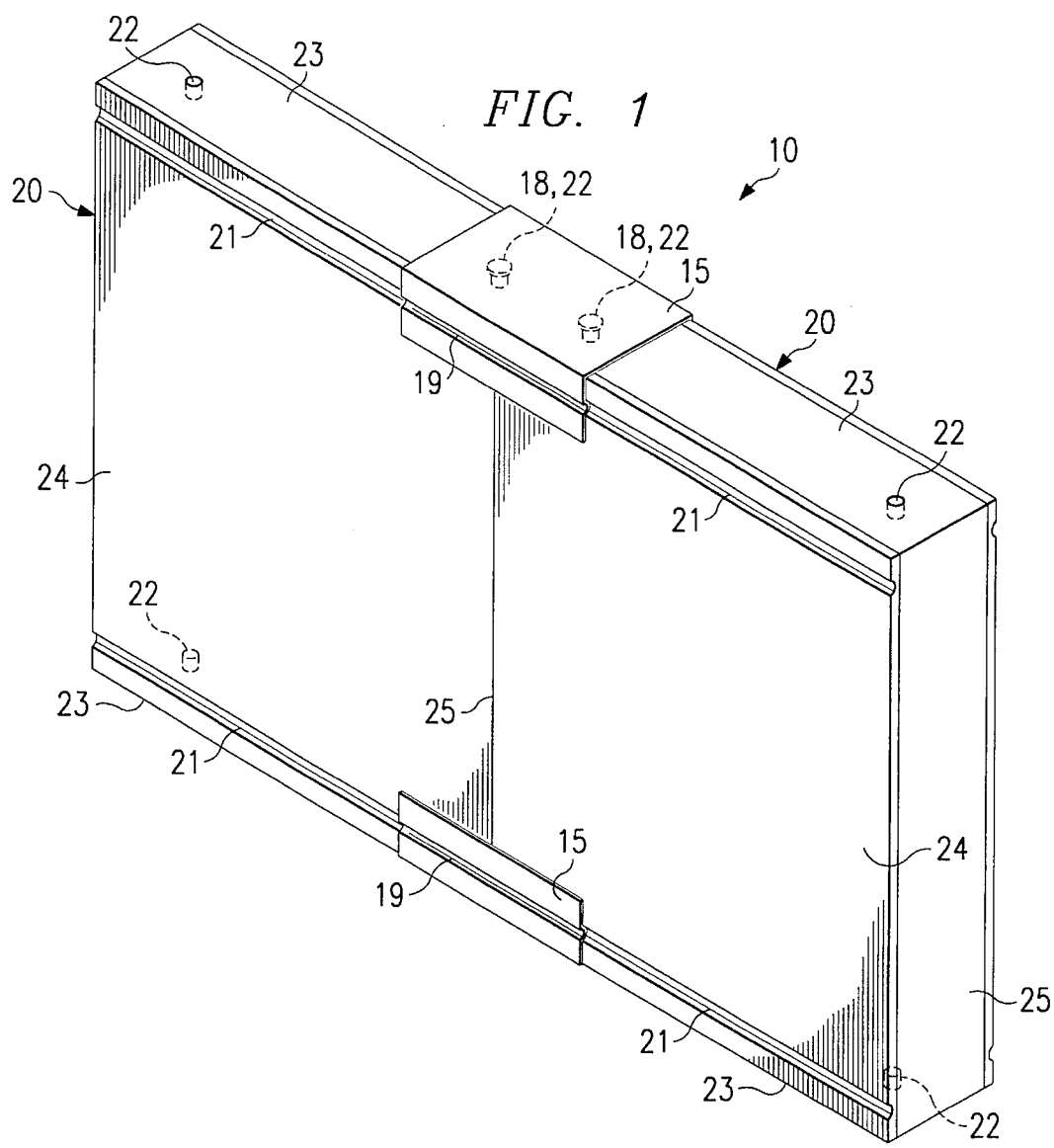
FIG. 1 is a perspective view of a panel connector system embodying the invention.

FIG. 1 shows a panel connector system 10 embodying the invention. The connector system 10 comprises a plurality of panels 20, each having upper and lower horizontal edges 23 and at least one vertical face 24. Adjacent panels 20 are connected by two connectors 15, one at each of the upper and lower horizontal edges 23.

Figure 2:
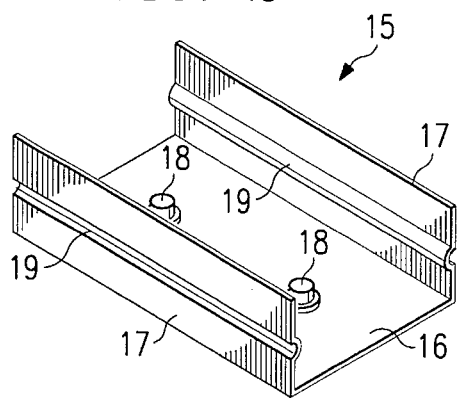
FIG. 2 is a perspective view of the underside of the connector.
Figure 3:
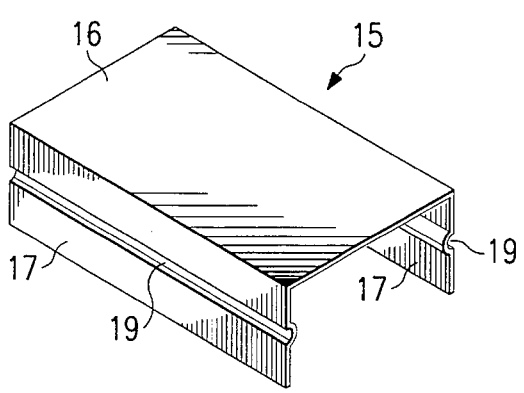
FIG. 3 perspective view of the connector.
Figure 6:
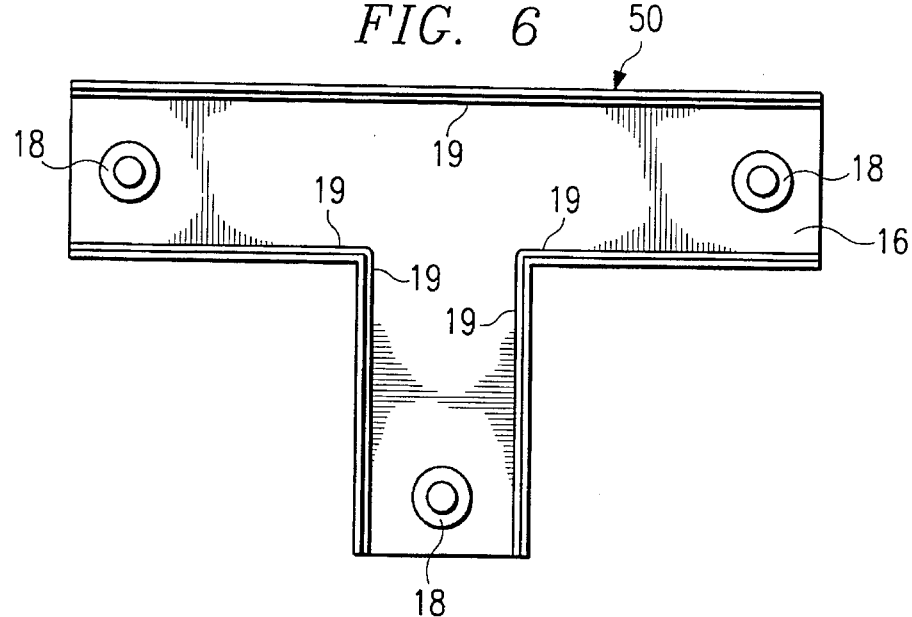
FIGS. 6 and 7 are bottom views of connectors for connecting three and four panels, respectively.
Figure 7:
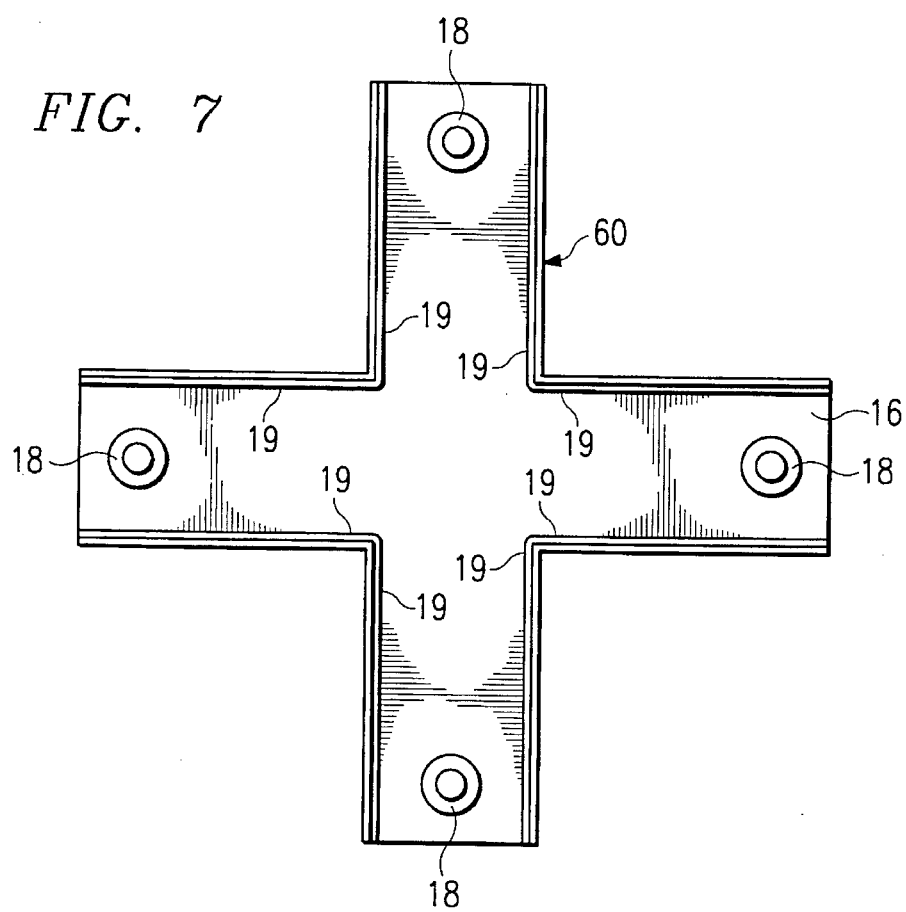

As shown on FIGS. 2 and 3, each connector 15 includes a base 16 having first and second legs 17 extending perpendicularly from the edges thereof. A pair of studs 18 are attached to the base 16 of the connector 15. Each of the legs 17 includes an inwardly extending rib 19. As shown in FIG. 1, when a connector 15 is installed on two adjoining panels 24, the ribs 19 engage a groove 21 in the face 24 of each panel 20. Each panel 20 includes a groove 21 near the upper and lower horizontal edges 23 of the panel 20. On each connector 15, one of the studs 18 is positioned in an orifice 22 (FIG. 4) near the vertical edge 25 of each panel 20. Referring now to FIG. 4, each panel 20 has a frame 30 comprising horizontal members 31 and vertical members 32. In this embodiment, the horizontal and vertical members 31, 32 are constructed of wood. A thin sheet of a suitable material, such as wood paneling or masonite, is attached to the frame 30 by suitable means, such as by gluing, nailing, or stapling.

As can be seen in FIG. 4, the groove 21 in the vertical face 24 of the panel 20 is positioned over the horizontal frame member 31. In this embodiment, there is a vertical face 24 on both sides of the panel 20, and grooves 21 in both of the vertical faces. It will be appreciated that if only one vertical face 24 is used, the grooves 21 on the side of the panel 20 not having a vertical face 24 will be in the upper and lower horizontal frame members 31. Further, it will be appreciated that if only one vertical face 24 is used, it is necessary to have grooves 21 only in the horizontal frame members 31 on the side of the panel 20 not having a vertical face 24; that is, it is not necessary to have grooves 21 in the vertical face 24, nor ribs 19 in the corresponding legs 17 of the connectors 15. Finally, it will be appreciated that it is necessary to install a connector 15 near only one of the upper and lower horizontal edges 23 of adjacent panels 20.

It will be appreciated by those of skill in the art that several important features of the invention can be reversed. The inwardly extending ribs 19 on the legs 17 of the connector 15 and the grooves 19 in the vertical faces 24 of the panels 20 can be replaced by grooves in the legs 17 and ribs in the vertical faces 24 Also, the studs 22 on the connector 15 and the orifices 22 in the horizontal member 31 can be replaced with orifices in the connector 15 and studs on the horizontal member 31.

FIGS. 5–8 show connectors 40, 50, 60 for joining two panels 20 at a right angle, three panels 20, and four panels 20, respectively. As with the connector 15 shown in FIGS. 1–3, the right angle connector 40, the three-panel connector 50, and the four-panel connector 60 each includes inwardly extending grooves 19 and inwardly extending studs 18.

The invention provides a panel connection system which is easy to use, adaptable, provides a secure connection, and positively locates adjacent panels relative to each other. Further, the invention requires a minimum number of components, thereby reducing the cost and complexity of the system. Still further, the invention is easily reconfigured.

While the preferred embodiment of the invention has been shown and described, it will be apparent to those skilled in this art that various modifications may be made to this embodiment without departing from the spirit of the present invention. For that reason, the scope of the invention is set forth in the following claims.

I claim:

1. A panel connector system comprising:

at least two panels, each panel including upper and lower horizontal members and at least one vertical face;

each panel including a horizontally extending groove in at least one of the group consisting of the upper horizontal member, the lower horizontal member, a vertical face adjacent to the upper horizontal member, and a vertical face adjacent to the lower horizontal member;

each panel including at least one orifice in at least one of the upper horizontal member and the lower horizontal member;

a connector including a base and two legs extending from opposed edges thereof and substantially perpendicularly thereto, at least one of said legs including an inwardly extending rib adapted to engage said groove in said panel; and said connector including at least two studs affixed to and extending substantially perpendicularly from the connector base, said studs arranged to allow a first one of said studs to slidably engage an orifice in a horizontal member of a first panel while a second one of said studs slidably engages an orifice in a horizontal member of a second one of said panels.

2. The panel connector system of claim 1, wherein said panels include two vertical faces, each of which includes a horizontally extending groove adjacent to a horizontal member.

3. The panel connector system of claim 2, wherein said vertical faces include horizontally extending grooves adjacent to the upper and lower horizontal members.

4. The panel connector system of claim 3, wherein each of the connector legs includes an inwardly extending rib adapted to engage the grooves in said vertical faces.

5. The panel connector system of claim 1 wherein the connector comprises two branches joined together at substantially a right angle.

6. The panel connector system of claim 1 wherein the connector comprises three branches joined together substantially in the shape of a T.

7. The panel connector system of claim 1 wherein the connector comprises four branches joined together substantially in the shape of a cross.

8. A panel connector system comprising:

a plurality of panels and at least one connector:

the panels including upper and lower horizontal members and two vertical faces attached thereto;

each vertical face including horizontally extending grooves adjacent to the upper and lower horizontal members;

each connector including a base, two legs extending substantially perpendicularly from opposed edges of the base, and two studs affixed to and extending from the base substantially parallel to the legs;

each connector leg including an inwardly extending lip adapted to engage a groove in a vertical face of a panel; and the studs being arranged so that, when the connector is installed on adjacent first and second panels, a first stud slidably engages an orifice in a horizontal member of the first panel and a second stud slidably engages an orifice in a horizontal member of the second panel.

9. The panel connector system of claim 8 wherein a first connector is installed adjacent to the upper horizontal members of the adjacent panels and a second connector is installed adjacent to the lower horizontal members of the adjacent panels.

10. The panel connector system of claim 8 wherein the connector comprises two branches joined together at substantially a right angle.

11. The panel connector system of claim 8 wherein the connector comprises three branches joined together substantially in the shape of a T.

12. The panel connector system of claim 8 wherein the connector comprises four branches joined together substantially in the shape of a cross.

13. A panel connector system comprising:

at least two panels, each panel including upper and lower horizontal portions and at least one vertical face;

horizontal engagement means on at least one of the group consisting of the upper horizontal panel portion, the lower horizontal panel portion, a vertical face adjacent to the upper horizontal panel portion, and a vertical face adjacent to the lower horizontal panel portion;

each panel including at least one vertical engagement means on at least one of the upper horizontal panel portion and the lower horizontal panel portion;

a connector including a base and two legs extending therefrom, at least one of said legs including a horizontal engagement means which compliments the panel horizontal engagement means; and said connector including at least two vertical engagement means which compliment the panel vertical engagement means, said connector vertical engagement means arranged so that a first one of the connector vertical engagement means is allowed to slidably engage a panel vertical engagement means on a first panel while a second one of the connector vertical engagement means engages a panel vertical engagement means on a second, adjacent panel.

* * * * *